United States Patent Office 3,261,875
Patented July 19, 1966

3,261,875
PRODUCTION OF CYCLIC DIENES
Roy L. Pruett, Charleston, W. Va., assignor to Union Carbide Corporation, a corporation of New York
No Drawing. Filed July 11, 1962, Ser. No. 209,251
15 Claims. (Cl. 260—666)

This invention relates to a process for the production of a cyclic diene by the dimerization of a conjugated diene. In other aspects, this invention relates to novel catalyst compositions and to a method for the preparation thereof.

It has already been proposed to dimerize a conjugated diene to cyclic olefinic compounds containing at least eight carbon atoms in the ring. The thermal non-catalyzed dimerization of 1,3-butadiene yields almost exclusively 4-vinylcyclohexene, with only small amounts of cyclooctadiene-1,5 being formed. Selective dimerization of a conjugated diene in the presence of various catalysts to produce substantial amounts of a cyclooctadiene has been proposed; however, processes utilizing such catalysts suffer from one or more disadvantages, such as high catalyst toxicity, lengthy reaction periods, formation of appreciable quantities of cyclododecatriene and higher polymers, and the like.

Accordingly, one or more of the following objects will be achieved by the practice of this invention.

It is an object of the invention to provide a novel process for the selective dimerization of a conjugated diene to produce a cyclooctadiene. It is another object of the invention to provide a novel process for the selective dimerization of a conjugated diene which avoids one or more of the disadvantages of the prior art. A further object of the invention is to prepare novel catalyst compositions. Other objects will become apparent to those skilled in the art in light of the instant specification.

In a broad aspect, the present invention is directed to a process which comprises contacting a conjugated diene with a catalytic amount of a hydrogenated bis(cyclopentadienyl)nickel-triarylphosphine complex, at an elevated temperature, and for a period of time sufficient to dimerize said diene. Cyclooctadiene is the major product of the selective dimerization of this invention.

The conjugated dienes which can be employed as reactants in the novel process are characterized by the presence therein of a $$-\overset{|}{C}=\overset{|}{C}-\overset{|}{C}=\overset{|}{C}-$$

unit and preferably contain 12 carbon atoms or less. Illustrative dienes are, for example, the conjugated alkadienes, such as 1,3-butadiene, isoprene, 1,3-pentadiene, 2,3-dimethylbutadiene, 1,3-hexadiene, 2,4-octadiene, 2-methylpentadiene-1,3, and the like; and the alkoxy-substituted conjugated alkadienes, such as 2-methoxybutadiene-1,3, 2,3-dimethoxybutadiene-1,3, 2-methoxy-3-ethoxypentadiene-1,3, and the like. Substituted conjugated dienes free of radicals which are reactive under the operating conditions of the present process can also be employed. The conjugated alkadienes which contain from 4 to 8 carbon atoms are highly preferred.

The catalyst complexes which are employed in the novel process can be readily prepared by hydrogenating a mixture of a triarylphosphine, a bis(cyclopentadienyl)-nickel compound, and a conjugated diene. Said catalyst complex can be prepared prior to the dimerization reaction and stored under an oxygen free atmosphere until needed. However, it is preferred to prepare the catalyst complex in situ, i.e., by hydrogenation of the triarylphosphine-bis(cyclopentadienyl)nickel compound mixture in the presence of the conjugated diene to be dimerized. After completion of the dimerization reaction and recovery of the volatile products and unreacted starting materials, the hydrogenated complex can be recovered and reused.

The exact composition of the novel hydrogenated catalyst complexes is not known at this time, but it appears that the active catalyst species contains both hydrogen and conjugated diene. Therefore, the term "hydrogenated complex(es)," is used generically and it includes the partially to essentially hydrogenated adducts, addition compounds, coordination compounds, and the like, which are formed under the operative conditions of the process.

The bis(cyclopentadienyl)nickel compounds suitably employed in the preparation of the novel catalysts have the general formula:

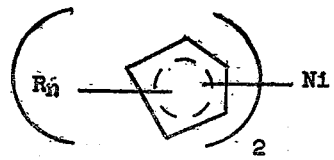

wherein R is an alkyl or aryl substituent free of groups which are reactive with the components of the reaction system herein employed, and wherein $n$ is an integer having a value of from 0 to 3. Illustrative of the bis-(cyclopentadienyl)nickel compounds are dicyclopentadienyl nickel, bis(methylcyclopentadienyl)nickel, bis(ethylcyclopentadienyl) nickel, bis(propylcyclopentadienyl)-nickel, bis(t-butylcyclopentadienyl)nickel, bis(dimethylcyclopentadienyl)nickel, bis(phenylcyclopentadienyl)nickel, bis(triethylcyclopentadienyl)nickel, and the like.

The triarylphosphines suitably employed in the preparation of the novel catalyst are those which have the general formula:

wherein Ar is an monovalent aryl radical which is free of groups that are reactive with the reactants and/or products of the novel process. Illustrative Ar radicals include phenyl, the alkylphenyls, e.g., tolyl, xylyl, ethylphenyl, cumyl, and the like; as well as the fused and bridged aryl radicals, e.g., naphthyl, biphenylyl, and the like. Illustrative triarylphosphines include triphenylphosphine, tritolylphosphine, tricumylphosphine, trixylylphosphine, trinaphthylphosphine, and the like.

The molar ratio of triarylphosphine to bis(cyclopentadienyl)nickel is not narrowly critical and this ratio can range from about 0.5:1, and lower, to about 10:1, and higher. A molar ratio of triarylphosphine to bis(cyclopentadienyl)nickel in the range of from about 1:1 to about 8:1 is preferred. A molar ratio in the range of from about 3:1 to about 5:1 is highly preferred.

The amount of hydrogen used to hydrogenate the bis-(cyclopentadienyl)nickel-triarylphosphine mixture is not narrowly critical; however, it is preferred to use a molar ratio of hydrogen to bis(cyclopentadienyl)nickel that is greater than one. A molar ratio of hydrogen to bis-(cyclopentadienyl)nickel in the range of from about 5:1 to about 15:1 is highly preferred. Higher molar ratios may be used but no particular advantage is observed.

The catalysts are employed in catalytically significant quantities. In general, a catalyst concentration in the range of from about 0.1, and lower, to about 25, and higher, weight percent, based on the weight of the dienic reactant, is suitable. A catalyst concentration in the range of from about 1 to about 10 weight percent is preferred. A catalyst concentration in the range of from about 2 to about 5 weight percent is highly preferred. For optimum results, the particular catalyst employed, the dienic reactant employed, the operative conditions under which the dimerization reaction is conducted, and other factors, will largely determine the desired catalyst concentration.

The dimerization reaction preferably is effected in the liquid phase, and to this extent sufficient pressure is employed to maintain an essentially liquid phase reaction mixture. An inert normally-liquid organic vehicle, such as various aliphatic and aromatic hydrocarbon media, e.g., benzene, toluene, hexane, heptane, and the like, can be employed in conjunction with the conjugated diene in order to obtain such liquid phase. In general, pressures in the range of from about 1 to about 100 atmospheres, or higher, can be employed. Preferably, the reaction is carried out under superatmospheric pressures, for example, from about 6 to about 60 atmospheres. The dimerization reaction can be conducted over a wide temperature range. Depending upon various factors such as the particular dienic reactant employed, the particular catalyst employed, the concentration of the catalyst, and the like, the reaction temperature can be as low as 50° C., and lower, and as high as 200° C., and higher. A reaction temperature in the range of from about 75° C. to about 140° C. is preferred.

In general, the reaction time will vary depending on the operative temperature, the particular catalyst and the concentration employed, and other factors. It has been observed that desirable results can be obtained by conducting the reaction for a period of time ranging from about 1 hour, and lower, to about 10 hours, and higher. At reaction temperatures of 150° C. to 180° C., it was observed that a reaction period of about 2 to 3 hours resulted in substantial dimerization, while at reaction temteratures of 90° C. to 120° C. a reaction period of up to 7 hours, or higher, may be desirable.

The novel process can be executed in a batch, semi-continuous, or continuous fashion. The reaction vessel can be a glass vessel, steel autoclave, elongated metallic tube, or other equipment and material employed in the art provided that such equipment is able to withstand the reaction pressures and that the catalyst employed is not sensitive to this material of construction. The order of addition of catalyst and conjugated diene does not appear to be critical. As hereinbefore described, a preferred procedure is to dissolve the bis(cyclopentadienyl)nickel component and the triarylphosphine component in the liquid conjugated diene under an inert atmosphere and to hydrogenate the resulting solution.

The cyclooctadiene-1,5 product can be recovered from the resulting reaction product mixture by conventional techniques such as flash distillation of said reaction product mixture under reduced pressures. The novel catalyst complex can be recovered from the reaction product mixture as a residue product after flash distillation of the volatile products and reused. Since said catalyst is extremely sensitive to oxidation, exposure to the atmosphere will result in loss of catalytic activity. Therefore preparation and storage of such complex must be conducted in a non-oxidizing atmosphere. The dimerized products which are obtained in accordance with the present invention are useful in the preparation of alcohols, ketones, acids, amines, epoxides, and various other derivatives. They can also be employed as a monomeric source in the preparation of useful polymers.

The following examples are illustrative.

*Example 1*

(A) To a 500 ml. Parr pressure vessel there were charged 3.8 grams of bis(cyclopentadienyl)nickel, 8.4 grams of triphenylphosphine, and 126 grams of 1,3-butadiene. A nitrogen atmosphere was provided during these additions in order to exclude air. The vessel and contents were placed on a platform rocker and pressurized with hydrogen to a pressure of 200 p.s.i.g. The vessel and contents were heated, while rocking, to a temperature in the range of from 130° C. to 140° C. Heating and rocking was continued for a period of 7 hours. During this period the pressure decreased from 520 p.s.i.g. to 215 p.s.i.g.

The vessel and contents were cooled to room temperature, i.e., about 24° C., and the unreacted 1,3-butadiene was vented. Flash distillation of the liquid fraction at a pressure of about 3 mm. of Hg and a temperature of about 70° C. gave 86 grams of distillate and 18.3 grams of residue. A vapor phase chromatograph of the distillate showed a $C_8$ fraction containing 58 weight percent of cyclooctadiene-1,5.

(B) In an analogous manner as above when isoprene is substituted for 1,3-butadiene, the distillate contains substantial amounts of 1,5-dimethylcyclooctadiene-1,5 and 1,6-dimethylcyclooctadiene-1,5.

*Example 2*

To a 500 ml. Parr pressure vessel there were charged the same materials employed in Example 1A. The reaction temperature was 125° C. to 135° C. After flash distillation of the liquid reaction product mixture, the distillate (86 grams) showed a $C_8$ fraction containing 65 weight percent of cyclooctadiene-1,5.

*Example 3*

(A) To a 500 ml. pressure vessel there were charged 7.6 grams of bis(cyclopentadienyl)nickel, 15.8 grams of triphenylphosphine and 126 grams of 1,3-butadiene. The vessel and contents were placed on a platform rocker and pressurized with 300 p.s.i. of hydrogen. They were then rocked, while maintained at a temperature of about 135° C., for a period of 16 hours. The $C_8$ fraction, after being isolated as in Example 1A, was found to contain 60 weight percent of cyclooctadiene-1,5.

(B) In an analogous manner as above, when 1,3-pentadiene is substituted for 1,3-butadiene, the distillate contains substantial amounts of 3,4-dimethylcyclooctadiene-1,5 and 3,7-dimethylcyclooctadiene-1,5.

Although the invention has been illustrated by the preceding examples, the invention is not to be construed as limited to the materials employed in the above examples but rather the invention encompasses the generic area as hereinbefore disclosed. Various modifications and embodiments of this invention can be made without departing from the spirit and scope thereof.

What is claimed is:
1. A process which comprises contacting a conjugated alkadiene containing from 4 to 12 carbon atoms with from about 0.1 to about 25 weight percent, based on the weight of the conjugated alkadiene, of an admixture of bis(cyclopentadienyl)nickel and a triarylphosphine, under hydrogen atmosphere, at a temperature of from about 50° C. to about 200° C., and for a period of time sufficient to dimerize said alkadiene.

2. The process of claim 1 wherein the molar ratio of bis(cyclopentadienyl)nickel to triarylphosphine is from about 1 to 1 to about 1 to 8 and wherein the molar ratio of hydrogen to bis(cyclopentadienyl)nickel is greater than one.

3. The process of claim 2 wherein the bis(cyclopentadienyl)nickel is dicyclopentadienyl nichel and wherein the triarylphosphine is triphenylphosphine.

4. A process which comprises contacting a conjugated alkadiene, at an elevated temperature and for a period of time sufficient to dimerize the alkadiene, with a catalytic amount of a catalyst, said catalyst formed by contacting with hydrogen a mixture of bis(cyclopentadienyl)nickel, a triarylphosphine and a conjugated diene.

5. The process of claim 4 wherein the temperature is in the range of from about 50° C. to about 200° C.

6. The process of claim 5 wherein the temperature is in the range of from about 75° C. to about 140° C.

7. The process of claim 4 wherein the alkadiene contains from 4 to 12 carbon atoms and the amount of catalyst is from about 0.1 to about 25 percent by weight, based on the weight of said alkadiene.

8. The process of claim 5 wherein the bis(cyclopentadienyl)nickel is dicyclopentadienyl nickel and the triarylphosphine is triphenylphosphine.

9. The process of claim 5 wherein the molar ratio of bis(cyclopentadienyl)nickel to triarylphosphine is from about 1 to 1 to about 1 to 8 and the molar ratio of hydrogen to bis(cyclopentadienyl)nickel is greater than one.

10. The process of claim 5 wherein the conjugated alkadiene is 1,3-butadiene.

11. The process of claim 10 wherein the bis(cyclopentadienyl)nickel and the triarylphosphine is triphenylphosphine.

12. A process for forming a catalyst capable of dimerizing a conjugated diene which comprises admixing a bis(cyclopentadienyl)nickel, a triarylphosphine and a conjugated diene, contacting the mixture with hydrogen at an elevated temperature and under superatmospheric pressure, for a period of time sufficient to produce said catalyst.

13. The process of claim 12 wherein the bis(cyclopentadienyl)nickel is dicyclopentadienyl nickel and the triarylphosphine is triphenylphosphine.

14. The process of claim 12 wherein the molar ratio of bis(cyclopentadienyl)nickel to triarylphosphine is from about 1 to 1 to about 1 to 8, the molar ratio of hydrogen to bis(cyclopentadienyl)nickel is greater than one and the temperature is from about 50° C. to about 200° C.

15. The catalyst of the process of claim 12.

References Cited by the Examiner
UNITED STATES PATENTS 2,964,575  12/1960  Sekul et al. _____ 260—666
2,972,640  2/1961   Burks et al. _____ 260—666

DELBERT E. GANTZ, *Primary Examiner.*

ALPHONSO D. SULLIVAN, *Examiner.*

C. E. SPRESSER, L. FORMAN, V. O'KEEFE,
*Assistant Examiners.*